United States Patent Office 2,805,711
Patented Sept. 10, 1957

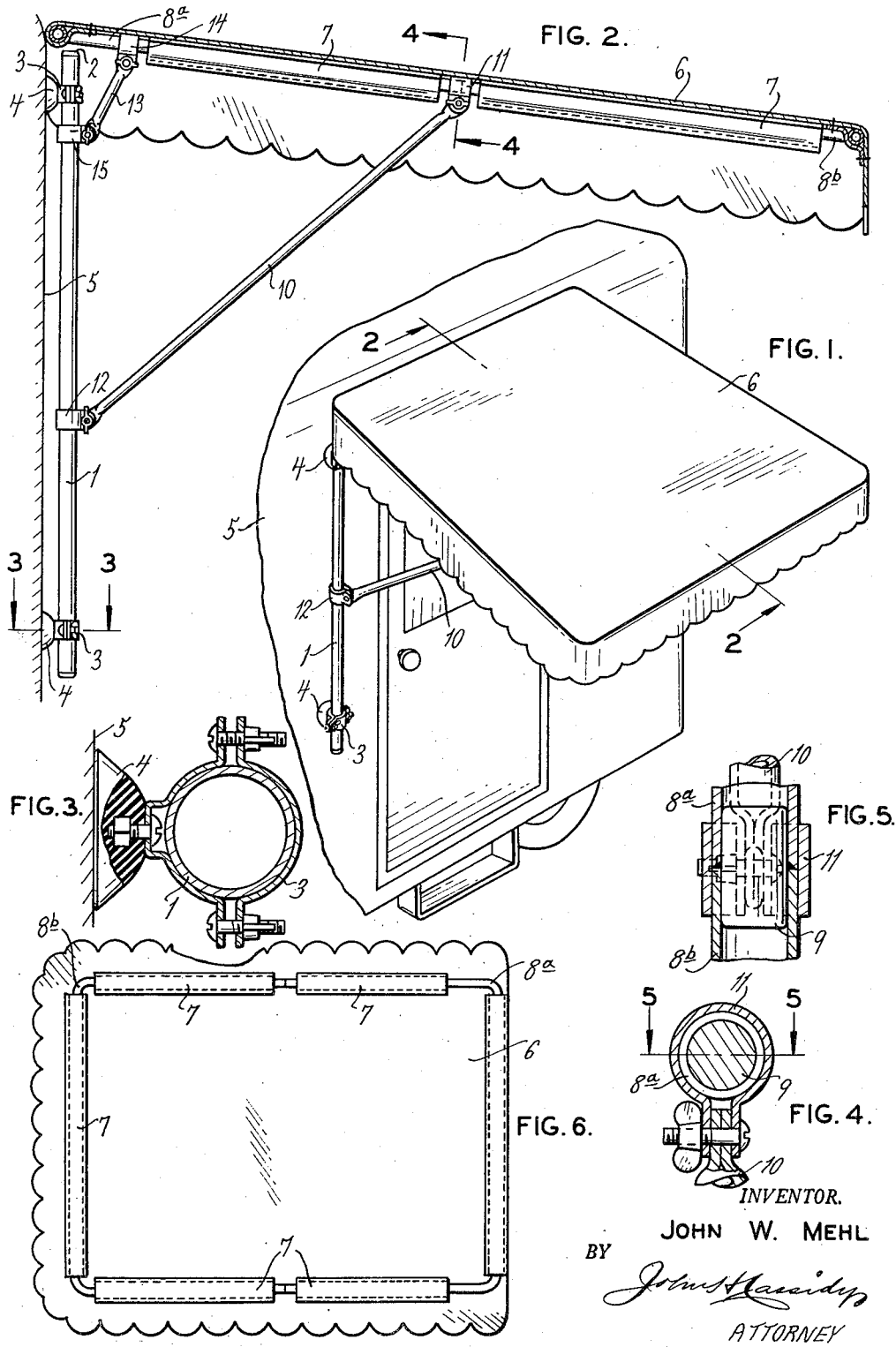

2,805,711

AWNING FOR TRAILER HOMES

John W. Mehl, Belleville, Ill.

Application December 17, 1952, Serial No. 326,388

3 Claims. (Cl. 160—76)

This invention pertains to awning for house trailers and the like.

An object of this invention is to provide an awning structure of simple form, which may be mounted on the trailer over a door or window, and which is easily dismountable and may be folded into compact form for storage in the trailer while traveling.

Another object is to provide such an awning structure which may be removably mounted on the trailer body in such a way as not to mar the surface or finish of the body.

Another object is to provide such a structure whereby the awning may be adjusted for height and inclination in a simple manner.

A further object is to provide an awning frame in separable sections from which the awning cloth may be removed and replaced in a simple manner.

In accordance with this invention generally stated, a pair of vertical side bars is attached to the trailer body one on each side of the door or window to which the awning is to be applied. These bars are secured to the body by suction cups adhesively mounted on the body so as to be removable when desired. The awning frame is mounted on supporting rods, one bar at each side of the frame connecting it to said vertical side bars. These supporting rods are independently adjustable on the side bars so that the angle of the awning may be adjusted. The side bars are mounted in clamps on the suction cups so as to be vertically adjustable for adjusting the height of the awning.

A preferred embodiment of this invention is illustrated in the accompanying drawing, in which—

Fig. 1 is a perspective view of a portion of a trailer showing the awning structure embodying this invention mounted thereon;

Fig. 2 is a vertical section on line 2—2 of Fig. 1;

Fig. 3 is an enlarged section on line 3—3 of Fig. 2;

Fig. 4 is a section on line 4—4 of Fig. 2;

Fig. 5 is a section on line 5—5 of Fig. 4; and

Fig. 6 is a bottom view of the awning frame with the awning cloth mounted thereon.

As shown in Figs. 1 and 2 of the drawing, 1 designates a vertical side bar, one of which is mounted on each side of the door of the trailer, these bars may consist of sections of metal tubing, preferably aluminum or other light metal, and may be closed by a plug 2 at its top and to prevent the entrance of water. The side bar 1 is mounted in a pair of ring clamps 3, each secured to a suction cup 4. The suction cups 4 are secured to the trailer body, indicated at 5, by pressing them against said body to exclude the air and provide adhesion by suction; however, a suitable adhesive may be applied to the cups 4 before attaching the same to the body 5. The rods 1 may be shifted vertically to any desired position by loosening the ring clamps 3 to shift the rods, and then re-tightening said clamps to secure the rods in their adjusted position.

An awning cloth 6 of any suitable pattern is provided, forming a canopy covering, usually of rectangular outline. As shown in Fig. 6, said cloth is bordered by a series of hems or pockets 7. A tubular awning frame of two U-shaped half-sections 8a and 8b is assembled with the cloth 6 by slipping said frame sections into the hem 7 as shown in Fig. 6. The ends of said U-shaped sections are brought together at the middle of the awning cloth 6. At these points, the ends may be provided with alignment plugs 9 one of which is shown in Fig. 5. Such plug may be attached to one half-section and arranged to slip into the tubular end of the other half-section.

With the awning frame assembled in this manner, a supporting rod or tube 10 is secured thereto by means of a clamp 11 which covers the joint between the frame sections 8a and 8b as shown in Fig. 2. The other end of the rod 10 is connected by a clamp 12 to one of the side rods 1. A second supporting rod 13, shorter than the rod 10, is secured by a clamp 14 to the awning frame and by a clamp 15 to the side rod 1. The pair of rods 10 and 13 is duplicated on the other side of the awning frame.

In the use of this device, it is set up as illustrated in Figs. 1 and 2. With the suction cups 4 attached to the trailer body, the side rods 1 are secured in the clamps 3. The rods 10 and 13 may then be adjusted along the rods 1 so as to set the awning at the desired elevation and inclination. It will be noted that the rods 10 and 13 may be adjusted independently of each other. Accordingly, the awning may be adjusted to any desired angle. The height of the awning may be adjusted without altering the inclination thereof by loosening the clamps 3 and shifting the side rods 1 as desired. When it is desired to remove the awning for traveling, the clamps 3 are loosened and the rods 1 are slipped out of said clamps to remove the awning from the trailer body. After thus removing the awning, the clamps 11 and 14 may be loosened and the rods 10 and 13 swing inward on these clamps as a hinge so as to fold the same against the inner face of the awning frame. This reduces the structure to a flat form which requires little storage space in the trailer while traveling. When in such folded position, if the rods 1 should protrude beyond the edges of the awning frame, the clamps 12 and 15 may be loosened and shifted along said rods so as to position the same within the outline of the awning frame.

It will be seen that this invention provides a simple structure for an awning which may be set up or taken down in a short time, and which provides protection against the sun while the trailer is parked, and at the same time, is easily removable and stored when traveling. The suction cups 4 are left in place on the trailer body while traveling, since they do not project far enough to be liable to damage. Accordingly, once they have been placed, they are always ready to receive the rods 1 which are thereby located in their correct position. When the awning cloth 6 becomes worn, it is easily replaced with a new one by removing the clamps 11 and 14 and separating the half-sections 8a and 8b by slipping them out of the pockets 7. Said frame sections may then be reassembled with a new awning cloth and the entire structure restored to its original form.

Various changes may be made in the details of construction, within the scope of the appended claims, without departing from the spirit of this invention. Parts of the invention may be used without the whole and improvements may be added while retaining some or all of the advantages of the invention.

I claim:

1. An awning for a house trailer, comprising, a pair of vertical side bars, vacuum cups removably attaching said bars to a wall one on each side of a door or window opening, a canopy having a rigid frame and a flexible cover therefor, and two supporting bars pivotally connected to said frame at each side thereof and adjustably fixed to one of said side bars to be supported thereby and to support said canopy, the upper one of said supporting bars being shorter than the lower one so as to hold said canopy in an outward-extending position sloping slightly downward.

2. An awning for a house trailer comprising a pair of vertical side bars adapted to be attached on either side of an opening in a housing structure, a canopy having a rigid frame, two supporting bars pivotally connected to each side of said frame at the upper ends of the supporting bars, a pair of clamping members adjustably movable along each side bar, and pivots connecting the lower ends of said supporting bars to said clamping members respectively, the upper one of said supporting bars being shorter than the lower one so as to hold said canopy in an outward-extending position sloping slightly downward.

3. An awning for a house trailer comprising a pair of vertical side bars adapted to be attached to either side of an opening in a housing structure, a canopy having a rigid frame, a pair of clamping members adjustably movable along each side of said frame, a pair of clamping members adjustably movable along each side bar, a pair of supporting bars on each side of said frame, and pivots attaching the upper ends of said bars to the clamping members on the frame and the lower ends of said bars to the clamping members on the side bars respectively, the upper ones of said bars being shorter than the lower one so as to hold said canopy in an outward-extending position sloping slightly downward.

References Cited in the file of this patent

UNITED STATES PATENTS

| | | |
|---|---|---|
| 364,853 | Pennington | June 14, 1887 |
| 619,957 | Hettrick | Feb. 21, 1899 |
| 1,345,585 | Cissel et al. | July 6, 1920 |
| 2,121,264 | Rubottom | June 21, 1938 |
| 2,583,663 | Obenchain | Jan. 29, 1952 |
| 2,629,144 | Moeller | Feb. 24, 1953 |

FOREIGN PATENTS

| | | |
|---|---|---|
| 22,711 | Great Britain | Oct. 13, 1906 |